United States Patent
Hagen et al.

(10) Patent No.: US 10,948,116 B2
(45) Date of Patent: Mar. 16, 2021

(54) COUPLING BODY FOR A PLUG CONNECTION OF PIPELINES, IN PARTICULAR PLASTIC PIPELINES

(71) Applicant: VOSS AUTOMOTIVE GMBH, Wipperfürth (DE)

(72) Inventors: Harald Hagen, Wipperfürth (DE); Lukas Röhrig, Marienheide (DE); Markus Waschkewitz, Bergneustadt (DE); Markus Frangenberg, Lindlar (DE)

(73) Assignee: VOSS Automotive GmbH, Wipperfurth (DE)

( * ) Notice: Subject to any disclaimer, the term of this patent is extended or adjusted under 35 U.S.C. 154(b) by 290 days.

(21) Appl. No.: 16/073,583

(22) PCT Filed: Jan. 26, 2017

(86) PCT No.: PCT/EP2017/051625
§ 371 (c)(1),
(2) Date: Jul. 27, 2018

(87) PCT Pub. No.: WO2017/129667
PCT Pub. Date: Aug. 3, 2017

(65) Prior Publication Data
US 2019/0040983 A1 Feb. 7, 2019

(30) Foreign Application Priority Data
Jan. 28, 2016 (DE) ............... 10 2016 101 533.4

(51) Int. Cl.
*F16L 37/091* (2006.01)

(52) U.S. Cl.
CPC .................. *F16L 37/091* (2013.01)

(58) Field of Classification Search
CPC .................................... F16L 37/091
(Continued)

(56) References Cited

U.S. PATENT DOCUMENTS 3,924,877 A * 12/1975 Leopold, Jr. ............ F16L 21/03
285/340
4,635,975 A * 1/1987 Campbell ............. F16L 37/091
285/340
(Continued)

FOREIGN PATENT DOCUMENTS

DE     3923579 A1    1/1990
EP     0132673 A2 *  2/1985  ............ F16L 37/008
(Continued)

*Primary Examiner* — James M Hewitt, II
(74) *Attorney, Agent, or Firm* — Eric J. Sosenko; Jonathan P. O'Brien; Honigman LLP

(57) ABSTRACT

A coupling element of a plug connection for tubing includes a retaining screw with an inner passage opening. The inner passage has a bearing shoulder on which a retaining element is arranged and behind which a sealing element is mounted. A sleeve-shaped spacing element is arranged between the retaining element and the sealing element, and the retaining element is axially held between the spacing element and a bearing shoulder of the inner passage opening. The sleeve-shaped spacing element has an axial length such that a restriction in the diameter of the wall of the inserted tube, produced when the retaining element is under load, is bridged by the spacing element such that the annular sealing element abuts against an undeformed area of the tube wall.

13 Claims, 7 Drawing Sheets

(58) Field of Classification Search
USPC .......................................................... 285/340
See application file for complete search history.

(56) References Cited

U.S. PATENT DOCUMENTS

| | | | | |
|---|---|---|---|---|
| 4,664,427 A | * | 5/1987 | Johnston | ............. F16L 37/0927 |
| | | | | 285/340 |
| 4,722,558 A | * | 2/1988 | Badoureaux | .......... F16L 37/091 |
| | | | | 285/242 |
| 4,911,406 A | * | 3/1990 | Attwood | ............... F16L 37/091 |
| | | | | 251/148 |
| 8,303,001 B2 | * | 11/2012 | Oh | ...................... F16L 25/0054 |
| | | | | 285/340 |
| 2011/0036081 A1 | * | 2/2011 | Lechner | .................. F16L 21/08 |
| | | | | 60/303 |

FOREIGN PATENT DOCUMENTS

| | | |
|---|---|---|
| EP | 1215434 A1 | 6/2002 |
| GB | 2071798 A | 9/1981 |
| WO | 1995/24581 | 9/1995 |

\* cited by examiner

COUPLING BODY FOR A PLUG CONNECTION OF PIPELINES, IN PARTICULAR PLASTIC PIPELINES

BACKGROUND

1. Field of the Invention

The present invention relates to a plug connector for tubing. More specifically, the invention relates to a coupling element of the plug connector.

2. Description of Related Art

In such a coupling element of the prior art, it has been determined that the peripheral seal that produces the inner seal is unable to ensure a permanent, reliable seal since a gap formation occurs between the tubing and the peripheral seal.

It is an objective of the present invention to ensure a reliable seal by means of the peripheral seal, and namely with coupling elements in which the assembly of the toothed ring and the peripheral seal takes place successively from one side.

SUMMARY OF THE INVENTION

The above is achieved according to the principles of the present invention based on the understanding that an indentation or constriction of the tubing is created by burying the teeth of the retaining ring at the periphery of the inserted tubing under load and, in particular, in the sense of a diameter reduction. This constriction thus has a specific axial extension. This constriction produced by the retaining ring can be bridged by using the spacing element according to the principles of the invention, and the peripheral seal runs outside of the constriction in the area of the inserted tubing, which has an undeformed tube surface, when the latter is in the inserted state. A secure and durable sealing of the sealing gap between the inserted tubing and the peripheral seal is ensured in this way.

The actual necessary bridging length is obtained by adding the length of the spacing element, for example, 3 mm, a distance to the teeth of the retaining element configured as a toothed disc or toothed ring, for example, 0.5 mm, and, for example, a third of the axial length of the peripheral groove, for example, 2.4 mm, for accommodating the peripheral seal, for example, 0.8 mm, and a diameter thereof of, for example, 1.8 mm. With the aforementioned dimension specifications is obtained a bridging length of, for example, 4.3 mm. A very short and cost-effective component can consequently be produced.

A length of the spacing element of, for example, 3 mm, is advantageous for example with the usual tubing sizes (inner diameter×wall thickness) 4 mm×0.85 mm; 4 mm×1 mm and 6 mm×1.5 mm and PA11, 12 or a PA 66 tube according to DIN 73378 (Feb. 1, 1996) with a maximum temperature of 120° C. A length of the spacing element of, for example, 2.5 mm, can be sufficient with smaller tube sizes than those above.

In a particular aspect of the invention, the posterior end face of the spacing element in the screwing direction forms at the same time the front groove wall in the screwing direction of the peripheral groove that accommodates the peripheral seal, so that the spacing ring is in direct contact with the peripheral seal, that is, the peripheral seal is supported on the spacing ring. In this way, the compressive forces arising under load, which are transmitted via the toothed ring to the spacing element, are introduced directly into the peripheral seal, which leads to an increased compression of the peripheral seal. A permeation of the gaseous medium located in the tubing is considerably reduced by the peripheral seal as a result of this increased compression of the peripheral seal in the peripheral groove, which leads to improved sealing.

Another aspect of the invention provides that the spacing element is supported with a retaining collar on an end stop of the retaining screw at its posterior end face in the screwing direction and forms the anterior groove wall in the screwing direction with its end face. Additional compression by the compressive forces of the peripheral seal acting on the spacing sleeve is hereby prevented. Rather, the compressive forces arising are introduced directly into the retaining screw.

In an advantageous aspect of the invention, a locking element is inserted in the posterior end of the retaining screw in the screwing direction, which in turn has an insertion opening for the tubing to be inserted. A peripheral seal for sealing the peripheral gap between the inserted tubing and the locking element is practically located in this connection in the interior of the insertion opening. This inner seal serves in essence as a dirt seal. The locking element can be inseparably connected to the retaining screw, for example, by means of beading, snap locking, or compression, that is, it can be separated only by destroying it. An alternative form provides that the locking element is screwed into the retaining screw so that the connection to the retaining screw can be detached.

It can furthermore be advantageous according to the invention if an insertion-limiting stop is configured as an end stop for the inserted tubing in the anterior end section of the passage opening of the retaining screw in the screwing direction. This insertion limiting stop ensures in addition that the coupling element cannot be pushed toward the tubing when it is screwed out of a connecting piece.

In another aspect, the invention provides a connector system especially for gaseous media, which is securely sealed against the inner pressure, and can be dismounted from or mounted on the connecting piece with the entire coupling element including the inserted tubing, and additionally cannot be pushed out of the tubing if the coupling element is in the dismounted state.

BRIEF DESCRIPTION OF THE DRAWINGS

The invention will be described in more detail in the following with the aid of the exemplary embodiments depicted in the figures, wherein.

Parts that are identical or fulfill the same function are always identified with the same reference characters in the different figures of the drawings.

DETAILED DESCRIPTION

Concerning the following description, the invention is not limited to the exemplary embodiments and thus not to all or several of the features or the described feature combinations, but rather that each individual partial feature of the/each exemplary embodiment is also of importance separately from all other partial features described in connection therewith per se and may also be provided in combination with any features of another exemplary embodiment.

Figure 1:
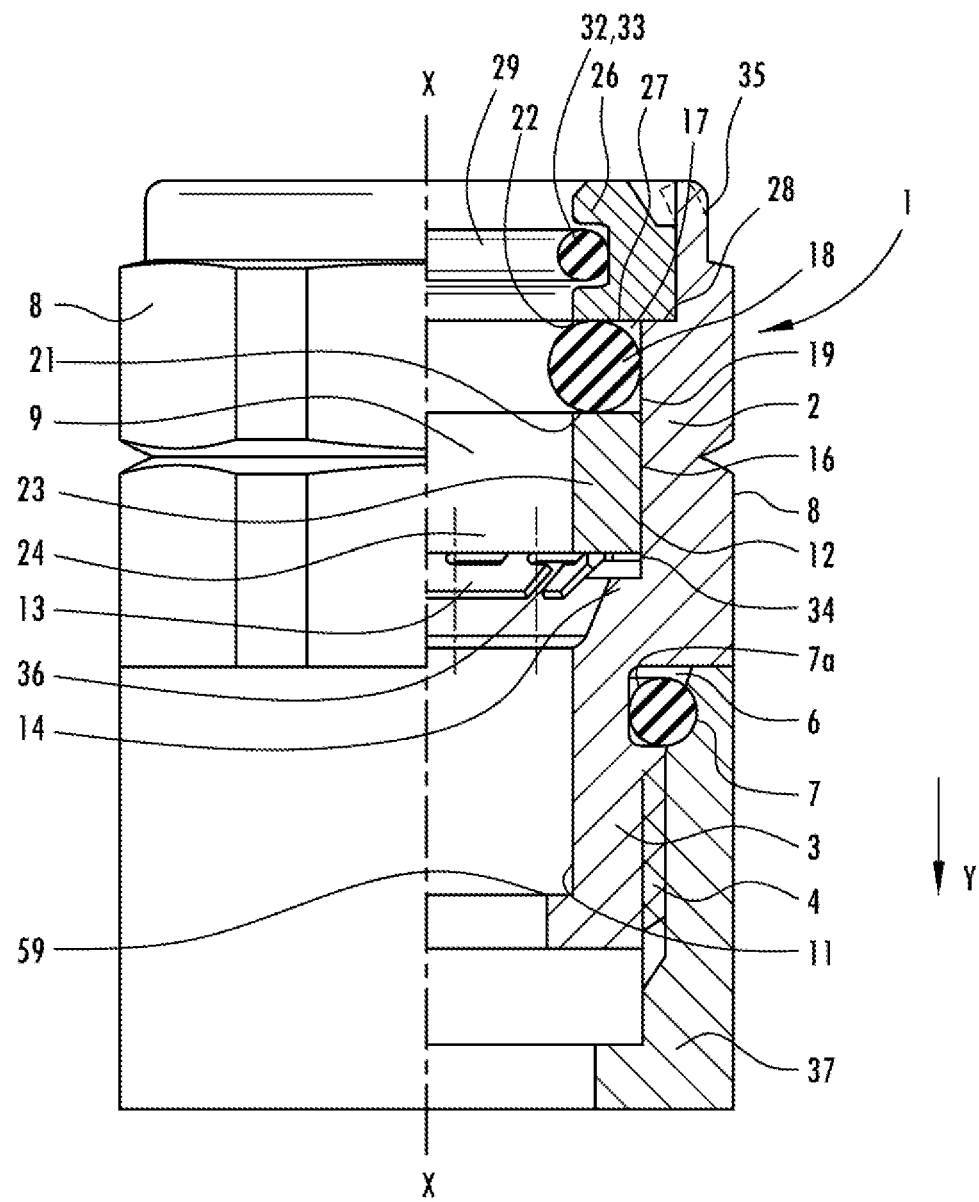
FIG. 1 shows a coupling element according to the principles of the invention in an elevational view in one half of the figure and in a longitudinal sectional view in the other half of the figure.
Figure 2:
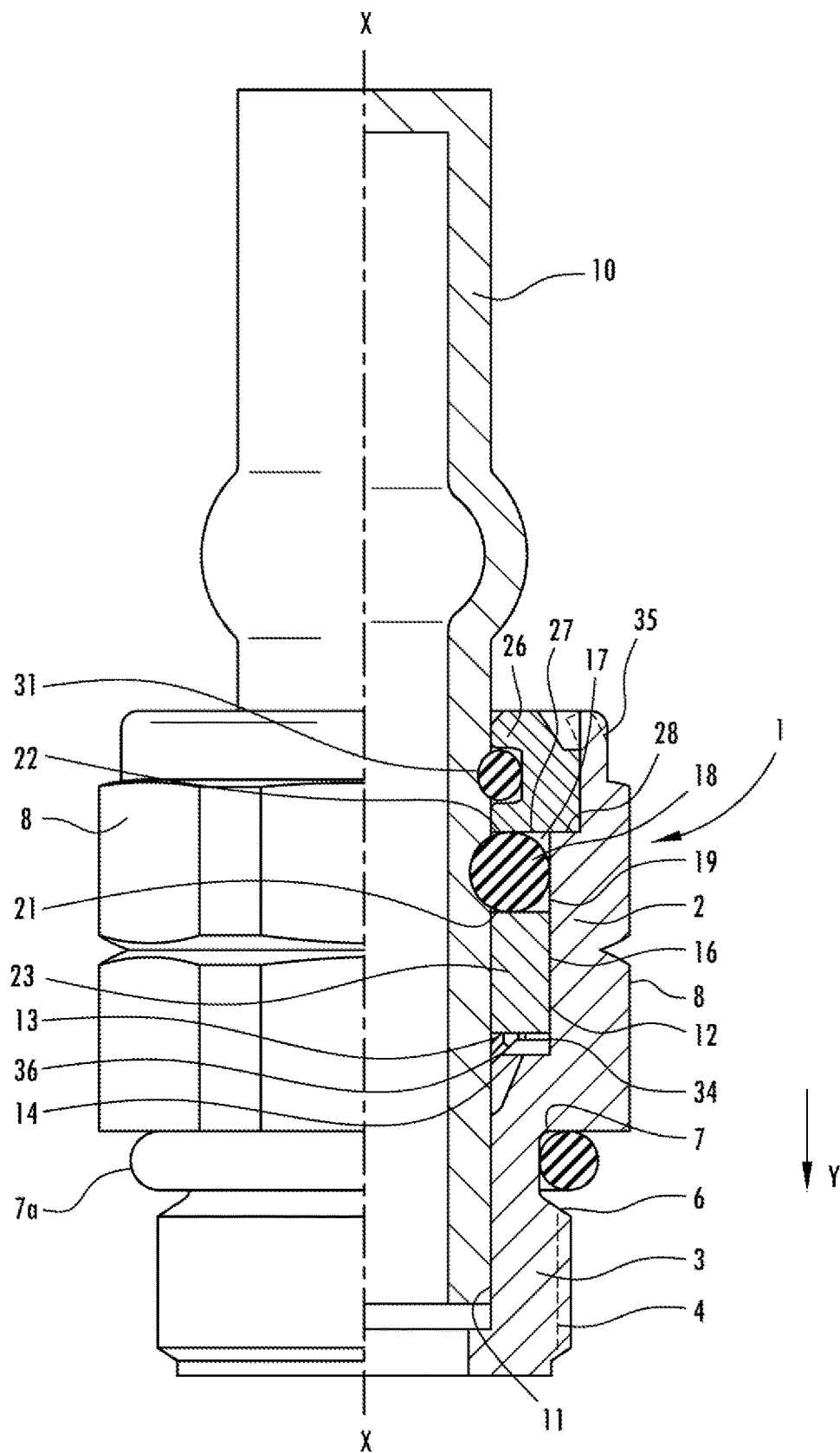
FIG. 2 shows a coupling element according to FIG. 1 with the tubing inserted.

As explained, for example, with the aid of FIG. 1, a coupling element 1 according to the invention for connection by inserting a tubing made, for example, of plastic and not represented in FIG. 1, comprises a retaining screw 2 with a screw shaft 3. The screw shaft 3 has an outer threaded section 4 in its anterior area in the screwing direction Y. The outer threaded section 4 may have a metric outer thread. A seal section 6 having a circumferentially running seal groove 7 and in which an annular seal 7a can be arranged connects preferably in the opposite direction to the screwing direction Y. The retaining screw 2 furthermore has an actuating section 8, which extends away from the screw shaft 3 in the opposite direction to the screwing direction Y. This actuating section 8 is especially configured as an external polygon, especially an external hexagon. The retaining screw 2 has an inner passage opening 9 into which the tubing 10 to be connected is inserted; see FIG. 2. The passage opening 9 has especially an anterior guiding section 11 seen in the screwing direction Y and a retaining and sealing section 12 connecting there behind in the screwing direction Y. As can be seen in FIG. 2, the guiding section 11 has an inner diameter that is adapted to the outer diameter of the tubing 10 in such a way that the latter is guided circumferentially in this guiding section 11. A retaining element 13 is furthermore arranged in the anterior area of the passage opening 9 seen in the screwing direction Y, with which the tubing 10 to be connected and inserted through the passage opening 9 can be fixed in its position within the coupling element 1. This retaining element 13 is configured as a toothed disc or toothed ring and rests on a contact shoulder 14 configured in the passage opening 9. This contact shoulder 14 running along the inner periphery of the passage opening 9 is produced by means of a diameter reduction of the passage opening 9, preferably at the transition to the guiding section 11, which has a conical configuration. The retaining and sealing section 12, for example, has an outer diameter that is greater than the outer threaded section 4. The retaining and sealing section 12 has an annular sealing element 18, as inner seal, in an inner peripheral groove 17 in its inner peripheral surface 16 which serves to seal the peripheral gap present between the inserted tubing 10 and the retaining and sealing section 12 to prevent a pressurized medium present in the tubing 10 from escaping. The annular sealing element 18 is preferably configured as an O-ring seal and is made from an elastically deformable material. The peripheral groove 17 has a groove base 19, which runs axially in the screwing direction Y and has mutually opposite groove side walls 21, 22 that end in the groove base 19, so that the peripheral groove 17 seen in longitudinal section has a U-shaped configuration. The side walls 21, 22 run preferably perpendicular to the groove base 19.

A sleeve-shaped spacing element 23 is arranged between the retaining element 13 and the sealing element 18. The spacing element 23 has a push-through opening 24, which is adapted to the outer diameter of the tubing 10 to be inserted. The retaining element 13 is held between an anterior end face of the spacing element 23 in the screwing direction Y and the contact shoulder 14. The posterior end face of the spacing element 23 in the screwing direction Y forms the anterior side wall 21 of the inner peripheral groove 17 in the screwing direction Y.

As shown in FIGS. 1 and 2, the spacing element 23 acts directly on the sealing element 18. Also as shown therein, a locking element 26 is configured in such a way that its anterior end face in the screwing direction Y, which forms the posterior groove wall 22 of the inner peripheral groove 17, is inserted into the passage opening 9 at its upper posterior section seen in the screwing direction Y. The locking element 26 additionally abuts with its anterior end face 27 against a stepped surface 28 in the passage opening 9 when it is inserted. A push-through opening 29 for the tubing 10 to be inserted is configured within the locking element 26, and a sealing arrangement 31, consisting of an inner groove 32 and a sealing ring 33, is provided in the interior of the peripheral surface of the push-through opening 29 of the locking element 26, which circumferentially seals the inserted tubing 10 against the penetration of dirt particles. The locking element 26 is especially fixed by beading a beading extension 35 at the posterior end of the retaining screw 2 in the screwing direction Y. This fixation can however also be carried out by pressing in or snap locking in the locking element 26. An inseparable connection, that is, a connection that cannot be separated without destroying it, is created between the locking element 26 and the retaining screw 2.

The sleeve-shaped spacing element 23 is dimensioned in its length in the axial direction in such a way that, when the retaining element 13, that is, the toothed disc or toothed ring, is under load, a notch in the sense of a reduction of an outer diameter and, if required, also of the inner diameter produced in the wall of the inserted tubing 10 is bridged by engaging the teeth therein, so that the peripheral seal, that is, the sealing element 18 runs in the region of the undeformed tubing 10, so that the sealing element 18 is not affected in its sealing effect with respect to the inserted tubing 10 if the tubing 10 and the coupling element 1 are pressurized by a pressurizing medium present in the tubing 10, especially a gaseous medium in the case of a load. In this load scenario, the tubing 10 is pressurized at its free tubing end in such a way at its end-side end face that the tubing 10 is pressed out of the coupling element 1 opposite to the screwing direction Y. In this connection, the teeth of the retaining element 13 bite into the wall of the tubing 10 and prevent a release of the tubing 10 from the coupling element 1. The invention is hereby based on the realization that the plunging and the thus radially directed forces of the teeth produce the above-described notch of the wall of the tubing 10. Such a notch can have an axial length of, for example, 2 to 3 mm. The size of the notch depends in particular from the dimension of the tubing 10, the material of the tubing 10, the respectively existing temperature, and the pressurizing forces at work and the shape of the retaining element 13.

In the embodiment shown in FIGS. 1 and 2, in which especially the spacing element 23, seen in cross section, has a circular or annular transverse cross section, the spacing element 23 is pressed by the retaining element 13 against the sealing element 18 when the tubing 10 is pressurized. The compression of the sealing element 18 within the peripheral groove 17 is thereby increased, so that the surface pressure of the sealing element 18 is increased at the contact surfaces of the peripheral groove 17 and at the peripheral surface 16 of the inserted tubing 10. The compression of the sealing element 18 reduces the size of the material and gas discharge surface of the sealing element 18 to decrease in the area of the sealing gap between the inserted tubing 10 and the inner peripheral wall of the passage opening 9 in the area seen in the screwing direction Y behind the inner seal or the sealing element 18. The arrangement of the spacing element 23 thus enables it to be pushed against the inner seal or the sealing element 18 when the tubing 10 is pressurized, and an increased tightness due to the reduction of the permeation of the pressurized medium, especially gas or air, by the sealing element 18.

In FIG. 1, the sleeve-shaped spacing element 23 has an outer diameter that is such that it can be freely displaced when applied on the inner peripheral surface of the passage opening 9, which has the same diameter over the length of its retaining and sealing section 12. A retaining element 13 used according to the invention has an outer circumferentially configured bearing section 34, on which teeth 36 running radially and axially, that is, are formed obliquely to the longitudinal axis X-X and circumferentially spaced with respect to each other. The outer diameter of the retaining element 13 in the area of the bearing section 34 is such that the retaining element 13 is mounted within the retaining and sealing section 12 so that it rotates freely.

As represented in FIG. 1, the coupling element 1 according to the principles of the present invention is screwed with its outer threaded section 4 into a connecting element 37 in a threaded bore.

The teeth 36 of the retaining element 13 enclose at their end side an opening whose inner diameter is smaller than the outer diameter of the tubing 10 to be inserted, so that the diameter of the opening enclosed by the teeth is enlarged when the tubing 10 is inserted in that the teeth 36 are elastically deformed and abut against the periphery of the tubing 10 with a non-positive lock when said tubing 10 is inserted and is still in depressurized state.

Figure 3:
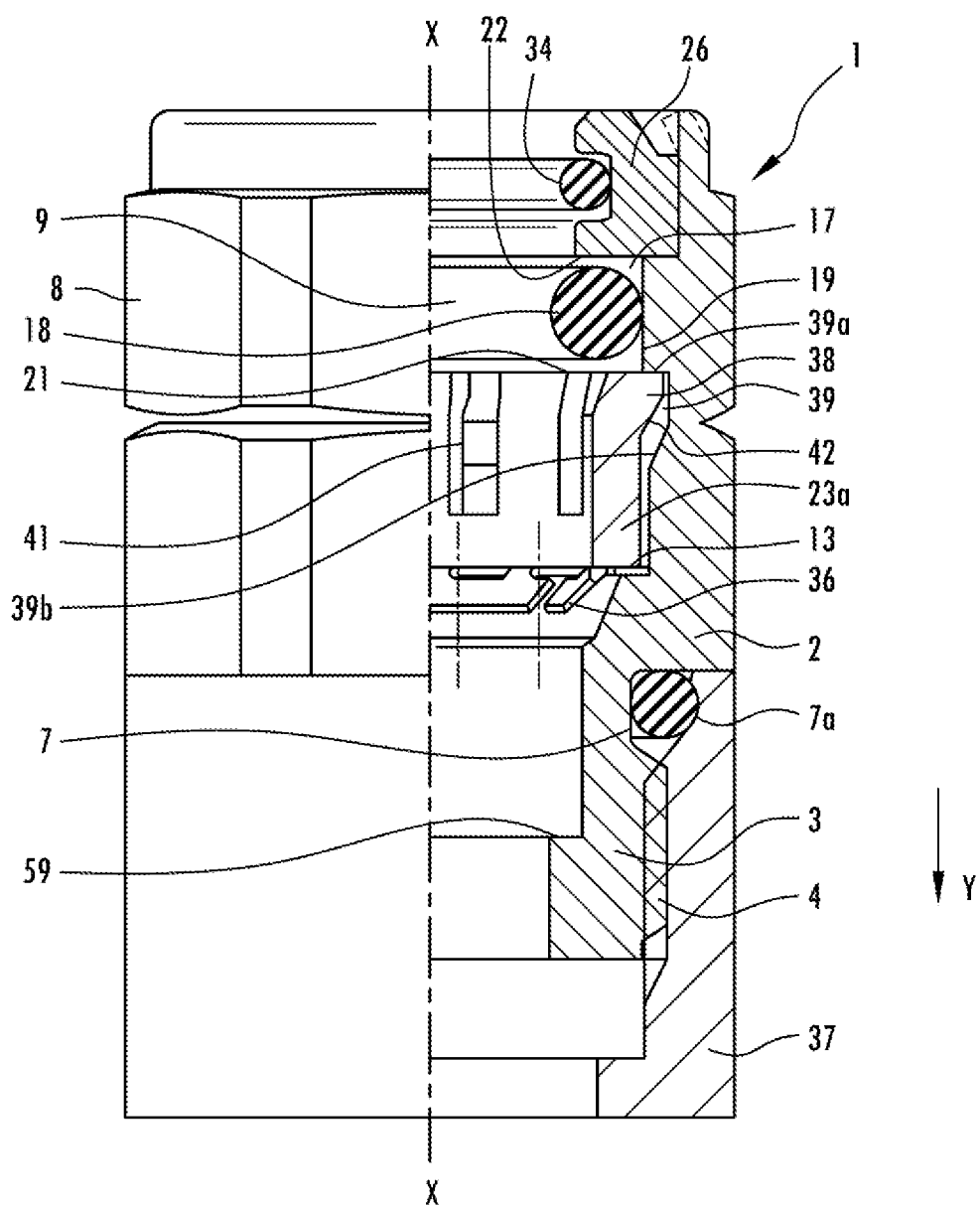
FIG. 3 shows another coupling element embodying the principles of the present invention in an elevational view in one half of the figure and in a longitudinal sectional view in the other half of the figure.
Figure 4:
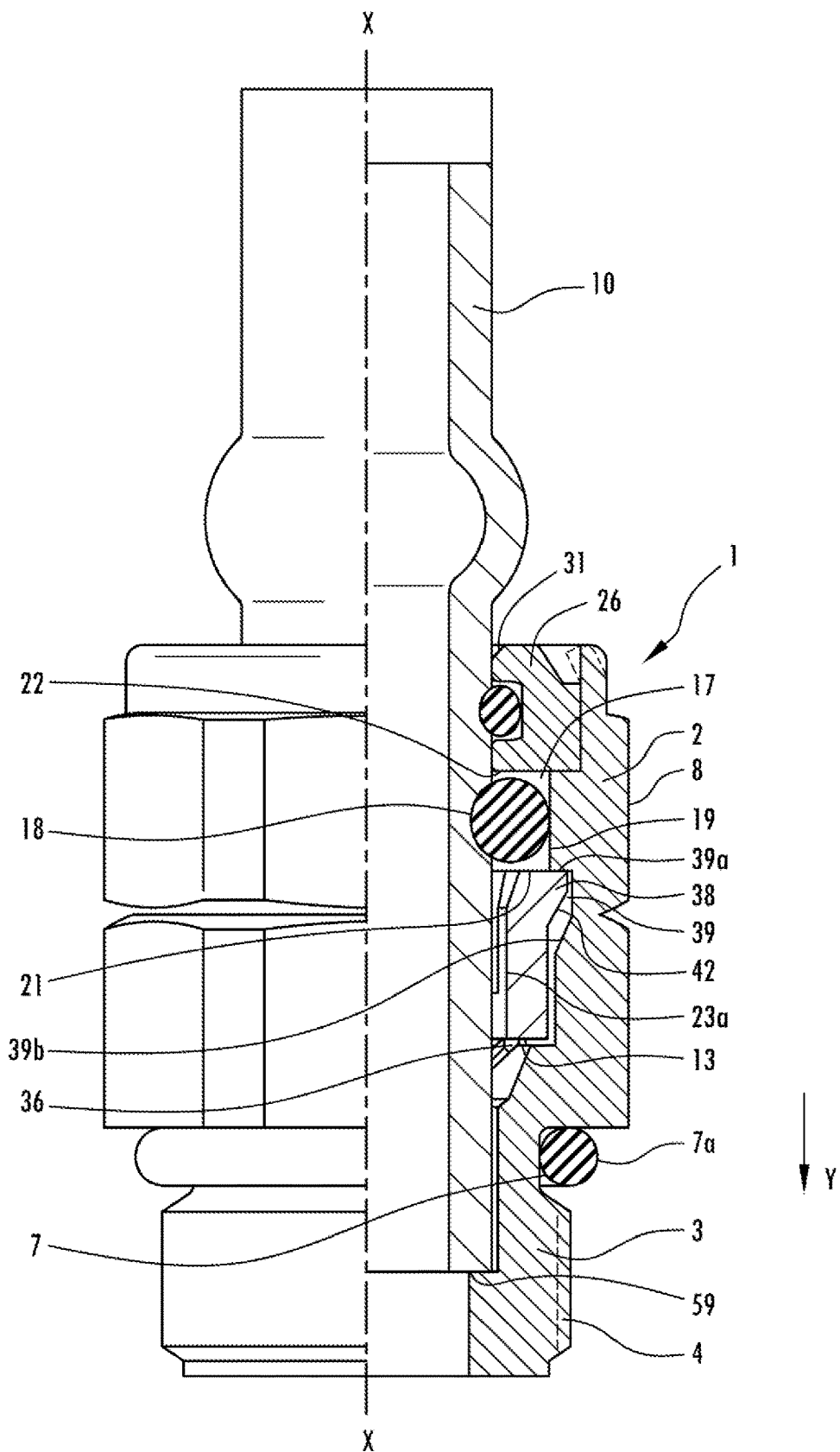
FIG. 4 shows the coupling element according to FIG. 3 with inserted tubing.

FIGS. 3 and 4 show another configuration of a sleeve-shaped spacing element 23a according to the principles of the invention. This spacing element 23a has a circumferential retaining collar 38 in its posterior end area in the screwing direction Y on its outer periphery. This retaining collar 38 locks within a retaining groove 39 that is open toward the passage opening 9 in the inner peripheral wall in the area of the retaining and sealing section 12 of the passage opening 9. For this purpose, the spacing element 23a is configured radially elastically deformable at least in the area of the retaining collar 38, to which end axially running, circumferentially spaced slots 41 are configured especially in the wall of the spacing element 23a.

Only one continuous slot can however also be present. The spacing element 23a is mounted between the retaining element 13, that is, the toothed disc or the toothed ring, that is arranged on the bearing shoulder 14 and a posterior side wall 39a of the retaining groove 39 seen in the screwing direction Y. The pressing forces acting on the retaining element 13 are hereby transmitted via this side wall 39a of the retaining groove 39 in the case of loading of the retaining screw 2 and do not act on the sealing element 18, so that the sealing element 18 is depressurized. The retaining collar 38 and the retaining groove 39 can also be arranged at another point of the spacing element 23a.

In order to facilitate a locking of the retaining collar 38 behind the side wall 39a, the latter preferably has an insertion slant 42 on its end face facing in the screwing direction Y. The side wall 39b of the retaining groove 39 facing the insertion slant 42 is suitably correspondingly slanted. The anterior side wall 21 of the peripheral groove 17 for the sealing element 18 seen in the screwing direction Y is also formed by the posterior end face of the spacing element 23a in this embodiment of FIGS. 3 and 4, and the other opposite side wall 22 of the peripheral groove 17 is formed by the locking element 26. Reference is made in its entirety to the description of FIGS. 1 and 2 with regard to the configuration of the locking element 26 and its attachment.

Figure 5:
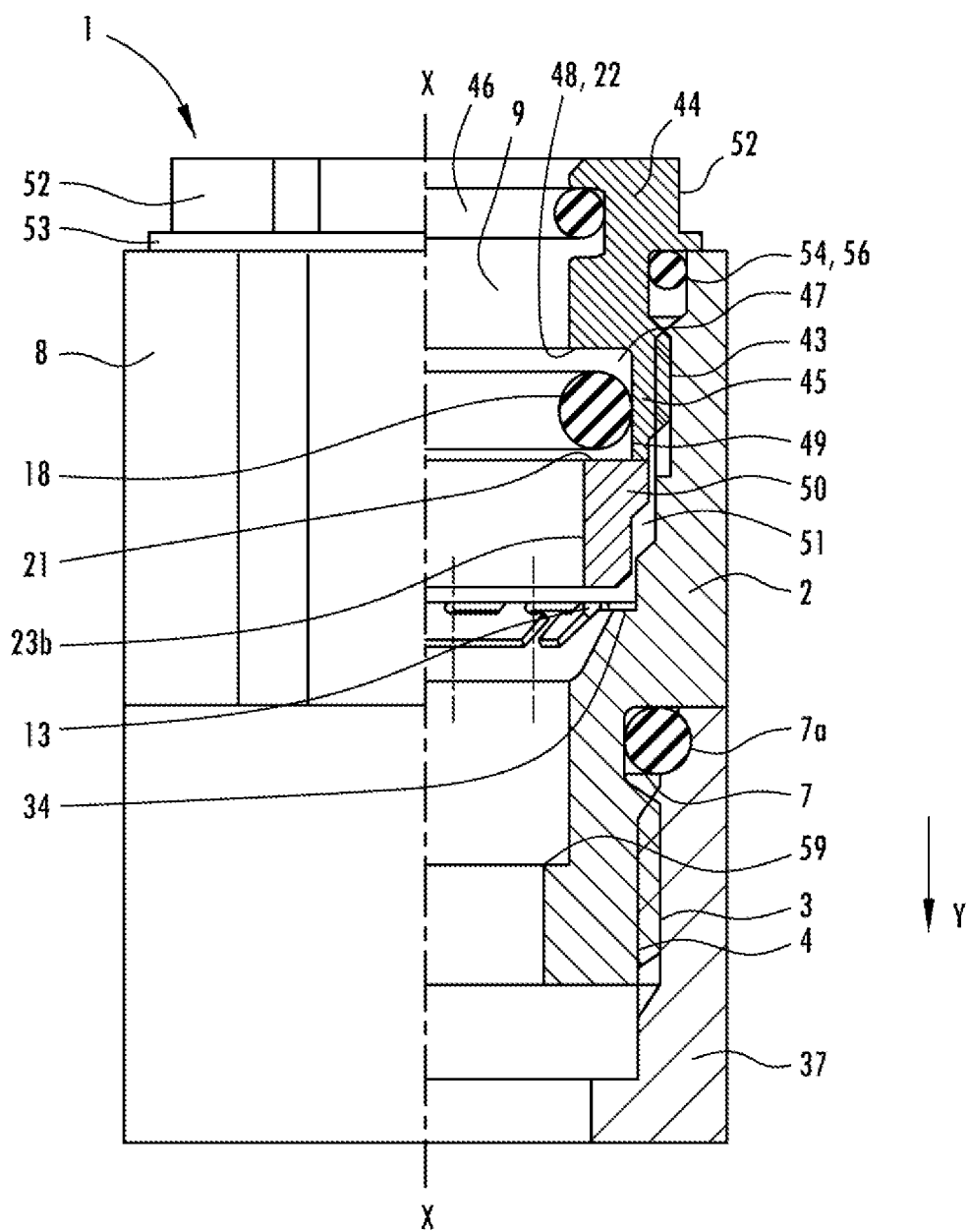
FIGS. 5 and 6 show further coupling element embodying the principles of the present invention in an elevational view in one half of the figure and in a longitudinal sectional view in the other half of the figure.

FIG. 5 depicts another coupling element 1 according to the principles of the present invention. The retaining screw 2 has hereby an inner threaded section 43 in its passage opening 9 in the posterior end area seen in the screwing direction Y, into which a locking element 44 with a sleeve-shaped outer threaded section 45 is screwed. This locking element 44 has a push-through opening 46 for the tubing 10 and a recess 47 with a posterior side wall 48 in the screwing direction running perpendicular to the longitudinal axis X-X in the area of its outer threaded section 45 and a recess base 49, which runs in the axial direction. The side wall 48 forms the posterior groove wall 22 of the peripheral groove 17, and the recess base 49 forms its groove base 19. A spacing element 23b forms the anterior groove wall 21 with its posterior end face. The outer threaded section 45 is configured in sleeve shape and encloses the sealing element 18. The sleeve-shaped spacing element 23b having a retaining collar 50 in its posterior area on its outer periphery in the screwing direction is arranged and held between the anterior end face of the outer threaded section 45 in the screwing direction Y, which is arranged in a retaining groove 51 formed by the outer threaded section 45 and the retaining screw 2. The sealing element 18 is arranged in the peripheral groove 17 formed by the locking element 44 and the spacing element 23b. The spacing element 23b abuts with the end face of its retaining collar 50 against the opposite end of the outer threaded section 45 and transmits the pressure forces acting on the spacing element 23b in the case of loading of the retaining screw 2, so that the inner seal or the sealing element 18 is non-positively relieved.

The locking element 44 has the sealing arrangement 31 for sealing against the penetration of dirt in the posterior section in the screwing direction Y of its push-through opening 46. The locking element 44 furthermore has a circumferential actuating section 52, which can be configured, for example, as a polygon, especially a hexagon. This actuating section 52 is located outside of the passage opening 9 and has a circumferential stop 53, with which the screwing depth of the locking element 44 in the passage opening 9 is limited. A circumferential groove 54 for accommodating an annular seal 56 for sealing the threaded sections against the discharge of the medium located in the interior of the passage opening 9 when under load is located between the actuating section 52 and the outer threaded section 45.

Figure 6:
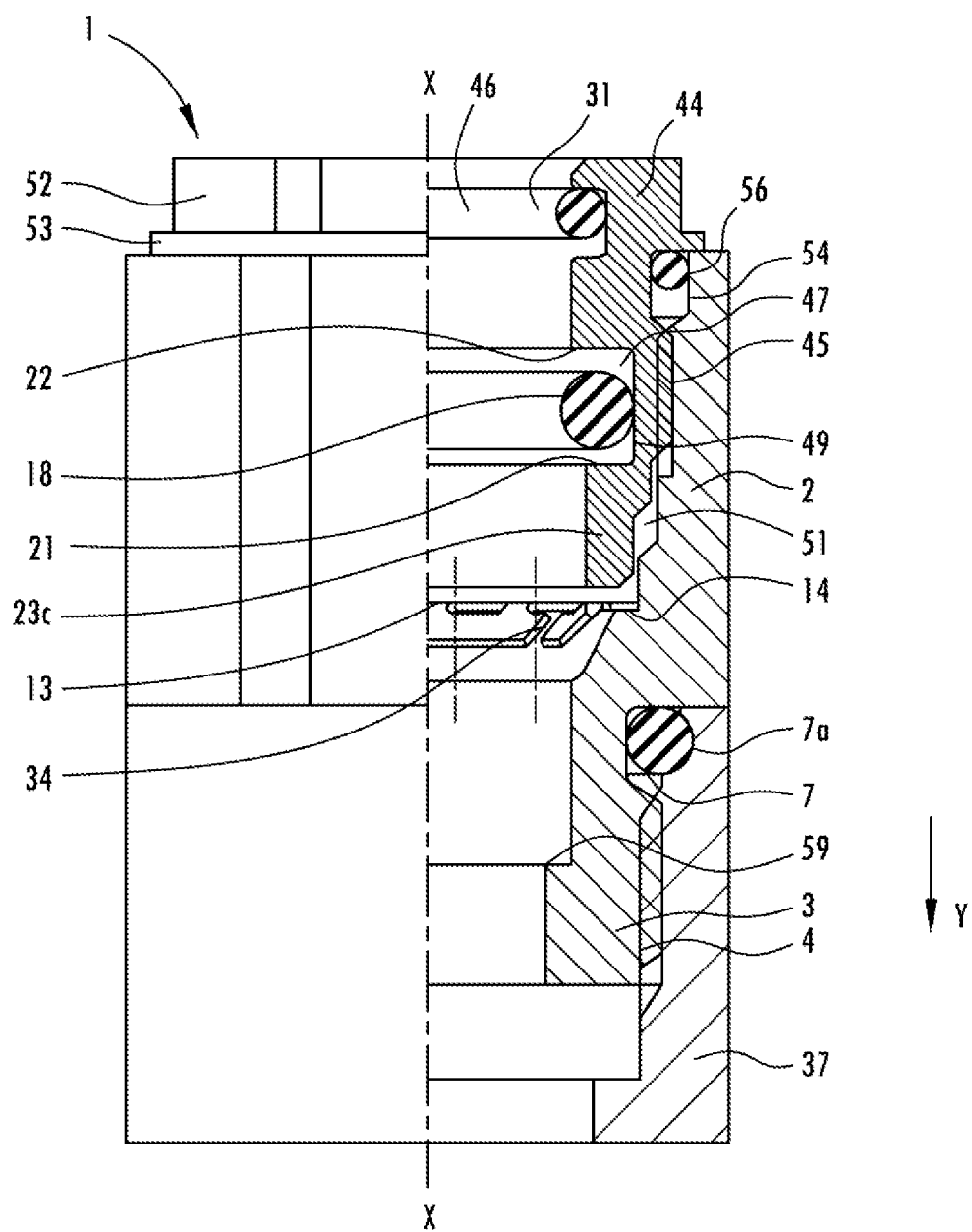

FIG. 6 depicts another coupling element 1 according to the principles of the invention. The retaining screw 2 receives the spacing element 23c and the locking element 44, which form a unified one-piece component in a further development of the coupling element 1 according to FIG. 5. The connection of the spacing element 23c to the locking element 44 is carried out in the area of the end of the outer threaded section 45 and the area of the retaining collar 50. The coupling element of FIG. 6 corresponds otherwise to the one shown in FIG. 5.

Figure 7:
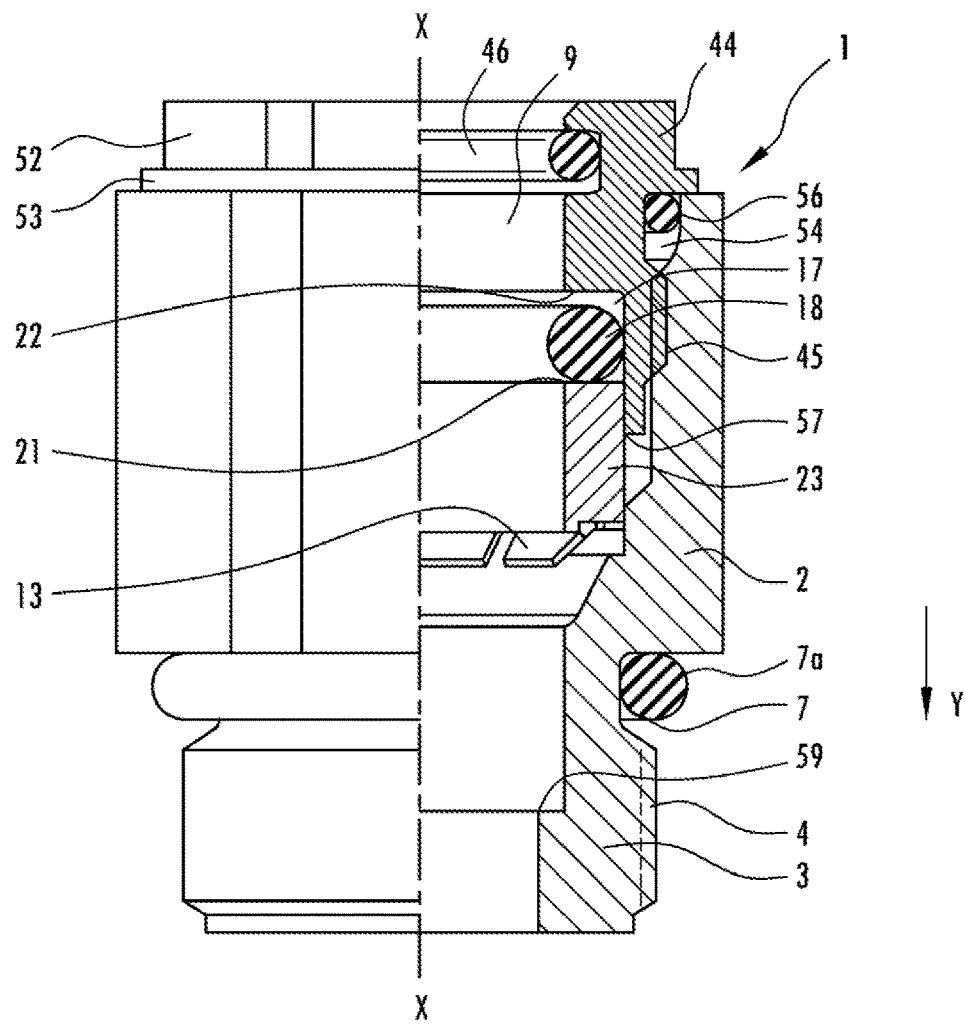
FIG. 7 shows another coupling element embodying the principles of the invention in an elevational view in one half of the figure and in a longitudinal sectional view in the other half of the figure.

FIG. 7 depicts another coupling element 1 according to the principles of the present invention. This coupling element 1 shows a combination of the spacing element 23 according to FIG. 1 with a screw-in part or locking element 44 according to FIG. 5 with a retaining screw 2 according to the invention. In this embodiment, the locking element 44 forms the peripheral groove 17 for accommodating the sealing element 18 together with the spacing element 23 in the area of the outer threaded section 45. The locking element 44 encloses the spacing element 23 with an extending section 57 configured at the front or anterior end in the screwing direction Y, which is configured ahead of the outer threaded section 45 in the screwing direction Y and is configured with or without an outer thread. With the locking element 44 screwed in, the extending section 57 is located between the retaining and sealing section 12 of the retaining screw 2 and the spacing element 23 and ends at a distance before the toothed disc or the retaining element 13.

Figure 8:
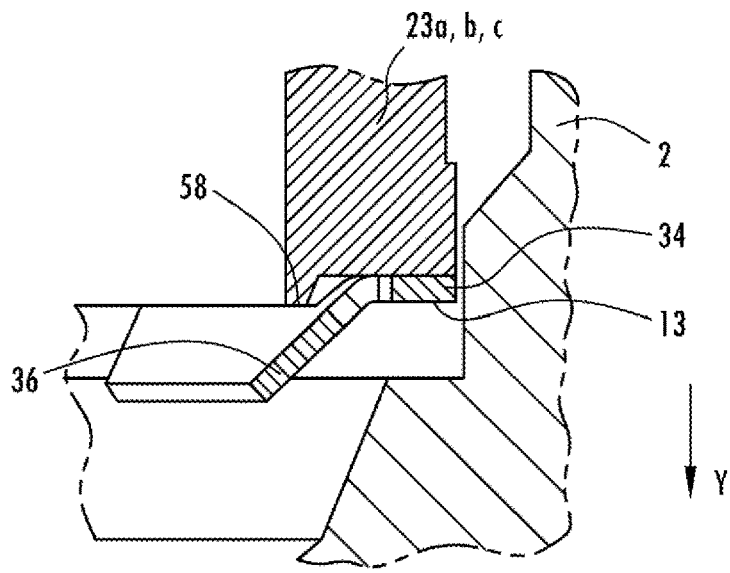
FIG. 8 shows an enlarged longitudinal sectional view of a spacing element and a corresponding retaining element.

FIG. 8 shows a modification of the spacing elements according to the principles of the present invention. The spacing elements 23, 23*a*, 23*b*, 23*c* thus possesses a retaining nose 58 that projects in the axial direction at its anterior end in the screwing direction Y at the rim of the push-through opening 24. This retaining nose 58 is configured in such a way that it ends ahead of the teeth 36. When the retaining element 13 is under load, the teeth 36 are supported by the retaining nose 58, so that high tubing pull-out forces are possible. The best force ratio is thus present when the teeth 36 are positioned at an angle of 30° to 60°, especially 45° with respect to the tubing 10. The dimension of the biting angle, especially of 45°, can be adjusted by means of the dimension of the retaining nose 58. The torque exerted on the retaining element 13 can additionally be reduced.

FIGS. 2 and 4 show the retaining screw 2 according to the principles of the present invention with tubing 10 inserted and unscrewed from and out of the connecting element 37. The tubing 10 that is inserted in the retaining screw 2 remains inserted when the retaining screw 2 is screwed out. This is possible since the retaining element 13 is dimensioned in such a way that it can be mounted around the longitudinal X-X within the retaining and sealing section 12 of the passage opening 9 such that it is free to rotate. Because the retaining element 13 is not rotationally fixed in the assembled state, the coupling element 1 rotates around the inserted tubing 10 when the connecting element 37 is being screwed out of the connecting element 37 so that the inserted tubing 10 does not become twisted.

It is advantageous with regard to the retaining screw 2 if a stop collar 59 is configured at the anterior end of the passage opening 9 in the screwing direction Y by means of a diameter reduction of the inner diameter. This stop collar 59 delimits, on the one hand, a depth stop, which limits the insertion depth when the tubing 10 is inserted and, on the other hand, prevents the coupling element 1 from being axially displaced out of the connecting element 37 toward the inserted tubing 10 when the retaining screw 2 is screwed out. The inner diameter of the stop collar 59 is advantageously greater than or equal to the inner diameter of the tubing 10 to be connected so that the inside tube cross section is not exceeded and flow losses are thus prevented.

The invention discussed herein is not limited to the represented and described exemplary embodiments, but also comprises all of the similarly acting embodiments in the sense of the invention. It is expressly emphasized that the exemplary embodiments are not limited to all features in combination, but rather that each individual partial feature is of inventive importance also separately from all other partial features per se. Furthermore, the invention is hitherto also not limited to the combination of features described herein, but can also be defined by any other desired combination of specific features. This means that basically practically every individual feature can be omitted or replaced with at least one individual feature disclosed at another point of the disclosure.

The invention claimed is:

1. A coupling element of a plug connector for tubing, the coupling element comprising:
    a retaining screw having a screw shaft with an outer threaded section at an anterior area to the screwing-in direction, the screw shaft connecting to an actuating section located posterior to the screwing-in direction, an inner passage opening runs in axial direction through the retaining screw, a contact shoulder located in the passage opening and extending radially inward to the longitudinal axis, a retaining element configured as a toothed disc or toothed ring is arranged on the contact shoulder, and an annular sealing element mounted in the passage opening posteriorly to the screwing-in direction to the toothed disc or toothed ring in a peripheral groove, the peripheral groove being open toward the passage opening and having a groove base and two mutually opposite side walls ending at the groove base,
    a sleeve-shaped spacing element arranged between the retaining element and the annular sealing element, the retaining element being held in an axial direction between an anterior end face in the screwing-in direction of the spacing element and the contact shoulder, the mutually opposing side walls of the peripheral groove including an anterior side wall in the screwing-in direction formed by a posterior end face in the screwing-in direction of the spacing element, and the spacing element having an axial length bridging an area of inward deformation of a wall of an inserted tube when the retaining element is under load and biting down with the teeth into the wall of the inserted tubing such that the annular sealing element abuts against an undeformed area of the tube wall, and
    a locking element engaged with the inner passage opening, an anterior end face of the locking element forming the posterior side wall of the peripheral groove, the locking element including a push-through opening at its posterior end in the screwing-in direction,
    the contact shoulder of the retaining screw delimiting axial movement of the spacing element in a first direction, one of the retaining screw and locking element including a stop surface engaging the spacing element and delimiting axial movement of the spacing element in a second direction opposite to the first direction.

2. A coupling element of a plug connector for tubing, the coupling element comprising:
    a retaining screw having a screw shaft with an outer threaded section at an anterior area in the screwing-in direction, the screw shaft connecting to an actuating section located posterior to the screwing-in direction, an inner passage opening runs in axial direction through the retaining screw, a contact shoulder located in the passage opening and extending radially inward to the longitudinal axis, a retaining element configured as a toothed disc or toothed ring is arranged on the contact shoulder, and an annular sealing element mounted on the passage opening posteriorly in the screwing-in direction to the toothed disc or toothed ring in a peripheral groove, the peripheral groove being open toward the passage opening and having a groove base and two mutually opposite side walls ending at the groove base, a sleeve-shaped spacing element arranged between the retaining element and the annular sealing element, the retaining element being held in an axial direction between an anterior end face in the screwing-in direction of the spacing element and the contact shoulder, the mutually opposing side walls of the peripheral groove including an anterior side wall in the screwing-in direction formed by a posterior end face in the screwing-in direction of the spacing element, and the spacing element having an axial length bridging an area of inward deformation of a wall of an inserted tube when the retaining element is under load and biting down with the teeth into the wall of the inserted tubing such that the annular sealing element abuts against an undeformed area of the tube wall, a locking element mounted in the passage opening, an anterior end face of the locking element forming the posterior side wall of the peripheral groove, the locking element including a push-through opening at its posterior end in the screwing-in direction, a portion of the locking element defining the groove base and one of the mutually opposed groove walls of the peripheral groove, the groove base being formed by a sleeve-shaped outer threaded section, an end-side end face of the sleeve-shaped outer threaded section forming a stop surface delimiting movement of the spacing element, and the outer threaded section being in threaded engagement with an inner threaded section of the passage opening.

3. The coupling element according to claim 2, wherein the spacing element interacts directly with the sealing element via mutual abutment.

4. The coupling element according to claim 2, wherein the spacing element has a cylindrical body having a circular annular cross section with reference to the longitudinal axis.

5. The coupling element according to claim 1, wherein the spacing element has a circumferential bearing collar at its outer periphery in a posterior end area to the screwing-in direction, whereby the spacing element is held in the passage opening within an inner retaining groove open toward the passage opening.

6. The coupling element according to claim 5, wherein a posterior end face in the screwing-in direction of the spacing element forms an anterior groove wall of the peripheral groove seen in the screwing-in direction and wherein the spacing element is mounted between a posterior side wall in the screwing-in direction of the retaining groove and the retaining element.

7. The coupling element according to claim 6, wherein the spacing element is elastically deformable in the radial direction at least in an area of the bearing collar and locks in the retaining groove in a positive locking manner.

8. The coupling element according to claim 2, wherein the sleeve-shaped outer threaded section includes an extending section circumferentially enclosing at least a portion of the spacing element.

9. The coupling element according to claim 2, wherein the locking element is non-detachably mounted in the passage opening by one of beading, compression, or snap locking.

10. The coupling element according to claim 2, wherein the passage opening includes a stop collar defined by a diameter reduction of an inner diameter of the passage opening, the stop collar being located on an anterior end in the screwing-in direction of the passage opening, the stop collar having an inner diameter greater than or equal to an inner diameter of a tubing to be inserted.

11. The coupling element according to claim 2, wherein the retaining element freely rotatably mounted within the passage opening.

12. The coupling element according to claim 2, wherein the spacing element includes a retaining nose projecting in an axial direction from a rim of a push-through opening in the spacing element, the rim being at an anterior end in the screwing-in direction and the retaining nose projecting a distance such that a terminal end of the retaining nose is radially inward of the teeth.

13. A coupling element of a plug connector for tubing, the coupling element comprising: a retaining screw having a screw shaft with an outer threaded section at an anterior area to the screwing-in direction, the screw shaft connecting to an actuating section located posterior to the screwing-in direction, an inner passage opening runs in axial direction through the retaining screw, a contact shoulder located in the passage opening and extending radially inward to the longitudinal axis, a retaining element configured as a toothed disc or toothed ring is arranged on the contact shoulder, and an annular sealing element mounted on the passage opening posteriorly to the screwing-in direction to the toothed disc or toothed ring in a peripheral groove, the peripheral groove being open toward the passage opening and having a groove base and two mutually opposite side walls ending at the groove base, the sealing member being in engagement with the groove base, a sleeve-shaped spacing element arranged between the retaining element and the annular sealing element, the retaining element being held in an axial direction between an anterior end face in the screwing-in direction of the spacing element and the contact shoulder, the mutually opposing side walls of the peripheral groove including an anterior side wall in the screwing-in direction formed by a posterior end face in the screwing-in direction of the spacing element, and the spacing element having an axial length bridging an area of inward deformation of a wall of an inserted tube when the retaining element is under load and biting down with the teeth into the wall of the inserted tubing such that the annular sealing element abuts against an undeformed area of the tube wall, a locking element engaged with a surface defining the inner passage opening, an anterior end face of the locking element forming the posterior side wall of the peripheral groove, a portion of the locking element defining the groove base and one of the mutually opposed groove walls of the peripheral groove, the groove base being formed by a sleeve-shaped exteriorly threaded section of the locking element.

* * * * *